United States Patent
Chang et al.

(10) Patent No.: US 9,651,087 B1
(45) Date of Patent: May 16, 2017

(54) LINEAR GUIDEWAY WITH QUICK-RELEASE SCRAPING PLATES

(71) Applicant: HIWIN TECHNOLOGIES CORP., Taichung (TW)

(72) Inventors: Lung-Yu Chang, Taichung (TW); Jing-Kai Liao, Taichung (TW); Bo-Han Huang, Taichung (TW); Sheng-Hsiang Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 15/068,021

(22) Filed: Mar. 11, 2016

(30) Foreign Application Priority Data

Dec. 30, 2015 (TW) .............................. 104221101 U

(51) Int. Cl.
*F16C 29/08* (2006.01)
(52) U.S. Cl.
CPC ........ *F16C 29/086* (2013.01); *F16C 2226/74* (2013.01)
(58) Field of Classification Search
CPC .................................................... F16C 29/086
See application file for complete search history.

(56) References Cited

U.S. PATENT DOCUMENTS

| 6,106,154 | A  | * | 8/2000 | Agari | F16C 29/065 384/13 |
| 6,715,920 | B2 | * | 4/2004 | Menges | F16C 29/0609 384/13 |
| 7,658,544 | B2 | * | 2/2010 | Chen | F16C 29/0633 384/15 |
| 7,686,514 | B2 | * | 3/2010 | Hung | F16C 29/086 384/15 |
| 2004/0146228 | A1 | * | 7/2004 | Lee | F16C 29/0607 384/45 |
| 2008/0159669 | A1 | * | 7/2008 | Chen | F16C 29/086 384/15 |

* cited by examiner

*Primary Examiner* — Thomas R. Hannon
(74) *Attorney, Agent, or Firm* — Wang Law Firm, Inc.

(57) ABSTRACT

A linear guideway with quick-release scraping plates includes: a linear guideway, two end caps, and two scraping plates. The end caps are each provided with a cantilever hook, and the scraping plates are each provided with an abutting protrusion to which the cantilever hook can be hooked, so that the assembly of the scaping plate in accordance with the present invention is very easy since it only requires the displacement of the scraping plate in one direction, and the disassembly of the scraping plate is also very convenient since it only requires the use of a rod.

10 Claims, 8 Drawing Sheets

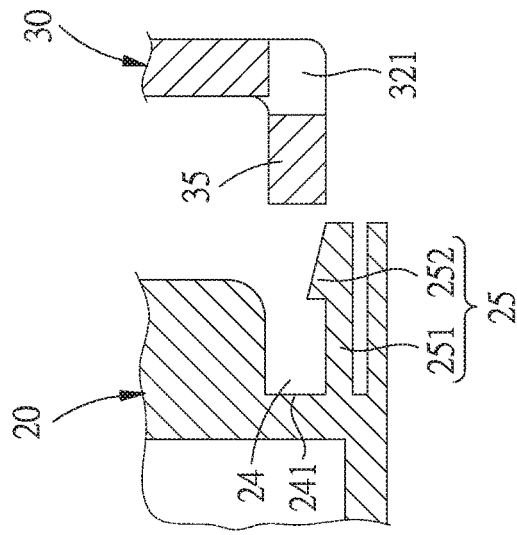
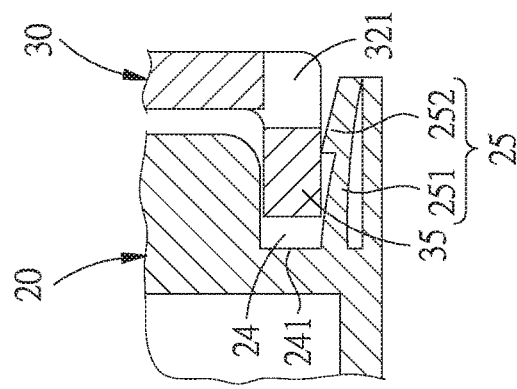
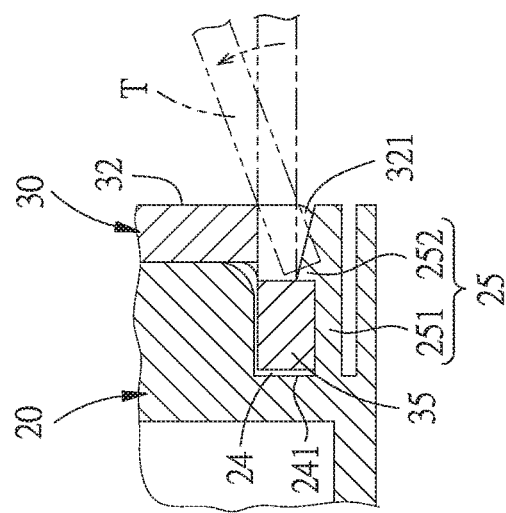
FIG.8C
FIG.8B
FIG.8A

LINEAR GUIDEWAY WITH QUICK-RELEASE SCRAPING PLATES

BACKGROUND OF THE INVENTION

Cross Reference to Related Application

This application claims the benefit of priority to TW104221101, filed on Dec. 30, 2015 with the Intellectual Property Office of the Republic of China, Taiwan, the entire specification of which is incorporated herein by reference.

FIELD OF THE INVENTION

The present invention relates to a linear guideway, and more particularly to a linear guideway with quick-release scraping plates.

RELATED PRIOR ART

A linear guideway generally comprises a slide block slidably mounted on a rail. At each of two ends of the slide block is disposed an end cap, and in the end cap is provided a return plate for enabling circulation. Each of the end caps is further provided with a scraping plate which is brought into contact with the rail to prevent dusts and foreign matters from coming into the slide block.

The scraping plate in early years is fixed to the end cap by screws. This type of scraping plate is easy to manufacture but difficult to assemble. Therefore, another type of scraping plate 10 as shown in FIG. 1 was invented, the edge of the scraping plate 10 which is located toward the end cap 11 is provided with a plurality of barbs 101 and protrusions 102. The end cap 11 is provided with a protruding edge 111 which is located corresponding to the barbs 101 of the scraping plate 10. Two holes 112 are formed in the protruding edge 111, and in each of the holes 112 is formed a shoulder portion 113. The end cap 11 is further provided with two cavities 114.

To assemble the scraping plate 10 onto the end cap 11, the barbs 101 have to be aligned with the holes 112, then the scraping plate 10 moves horizontally toward the end cap 11 until the barbs 101 are inserted into the holes 112, and then the scraping plate 10 moves vertically until the protrusions 102 are inserted in the cavities 114, and thus the assembling is finished. The scraping plate 10 is not easy to assemble since it needs to move in two different directions during assembling. Besides, positioning and retention will also be formed in two directions after the scraping plate 10 is assembled onto the end cap 11, which is not conducive to disassembly.

The present invention has arisen to mitigate and/or obviate the afore-described disadvantages.

SUMMARY

The present invention is aimed at providing a linear guideway with quick-release scraping plates, which is capable of solving the problem that the assembling of the scraping plate of the conventional linear guideway must require displacement of the scraping plates in two directions.

Therefore, a linear guideway with quick-release scraping plates in accordance with one aspect of the present invention, comprises:

a linear guideway including a slide block slidably mounted on a rail;

two end caps each including a first end surface, an opposing second end surface, and an engaging gap, the second end surface being provided with two connecting grooves which are located at two sides of the engaging gap, each of the connecting grooves being defined by a plurality of flat surfaces, wherein one of the flat surfaces is a bottom surface which is in parallel to the second end surface, the bottom surface of each of the connecting grooves is formed with a cantilever hook which has one end connected to the bottom surface and another end provided with a hook portion, the two end caps are mounted on the rail in such a manner that the rail is inserted in the engaging gaps, and the first end surfaces of the end caps are abutted against two ends of the slide block; and two said scraping plates each including an inner surface, an opposing outer surface, a mounting gap, and two recesses located at two sides of the mounting gap, an abutting protrusion being formed at a connection between the inner surface of the scraping plates and each of the recesses, wherein the abutting protrusions are perpendicular to the inner surface, on the outer surface are formed two operation recesses which are located adjacent to the abutting protrusion, respectively, the two scraping plates are mounted on the rail in such a manner that the rail is inserted in the mounting gaps, the inner surfaces of the scraping plates are abutted against the second end surfaces of the end caps, the abutting protrusions are inserted in the connecting grooves, and the hook portions of the cantilever hooks are hooked in the operation recesses.

A linear guideway with quick-release scraping plates in accordance with another aspect of the present invention, comprises:

a linear guideway including a slide block slidably mounted on a rail;

two end caps each including a first end surface, an opposing second end surface, and a cantilever hook which has one end connected to the second end surface and another end provided with a hook portion, the two end caps are mounted on the rail in such a manner that the first end surfaces of the end caps are abutted against two ends of the slide block; and two said scraping plates each including an inner surface, an opposing outer surface, and two recesses, an abutting protrusion being formed at a connection between the inner surface of the scraping plates and each of the recesses, wherein the abutting protrusions are perpendicular to the inner surface, on the outer surface are formed two operation recesses which are located adjacent to the abutting protrusions, respectively, the two scraping plates are mounted on the rail in such a manner that the inner surfaces of the scraping plates are abutted against the second end surfaces of the end caps, the scraping plates move in a first direction until the abutting protrusions climb over and are hooked by the cantilever hooks, and the scraping plates are released by inserting a rod into the operation recesses and pressing the cantilever hooks.

The end caps are each provided with a cantilever hook, and the scraping plates are each provided with an abutting protrusion to which the cantilever hook can be hooked, so that the assembly of the scraping plate in accordance with the present invention is very easy since it only requires the displacement of the scraping plates in one direction, and the disassembly of the scraping plates is also very convenient since it only requires the use of a rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 8A is an operational view showing disassembling of the scraping plates from the end cap in accordance with the present invention;

FIG. 8B is a second operational view showing disassembling of the scraping plates from the end cap in accordance with the present invention; and FIG. 8C is a third operational view showing disassembling of the scraping plates from the end cap in accordance with the present invention.

DETAILED DESCRIPTION

The present invention will be clearer from the following description when viewed together with the accompanying drawings, which show, for purpose of illustrations only, the preferred embodiment in accordance with the present invention.

Figure 1:
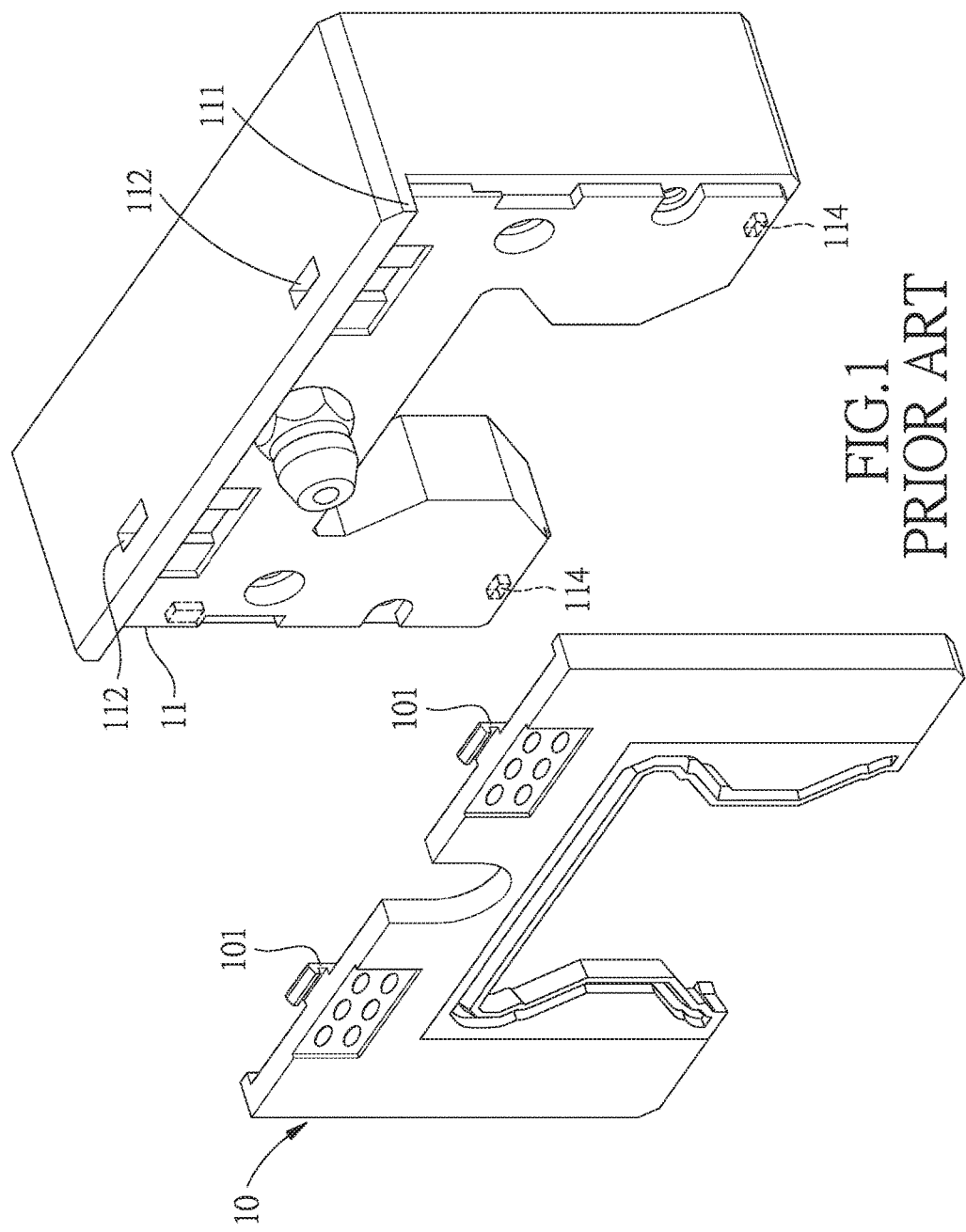
FIG. 1 is an exploded view of a conventional end cap with a scraping plate.
Figure 2:
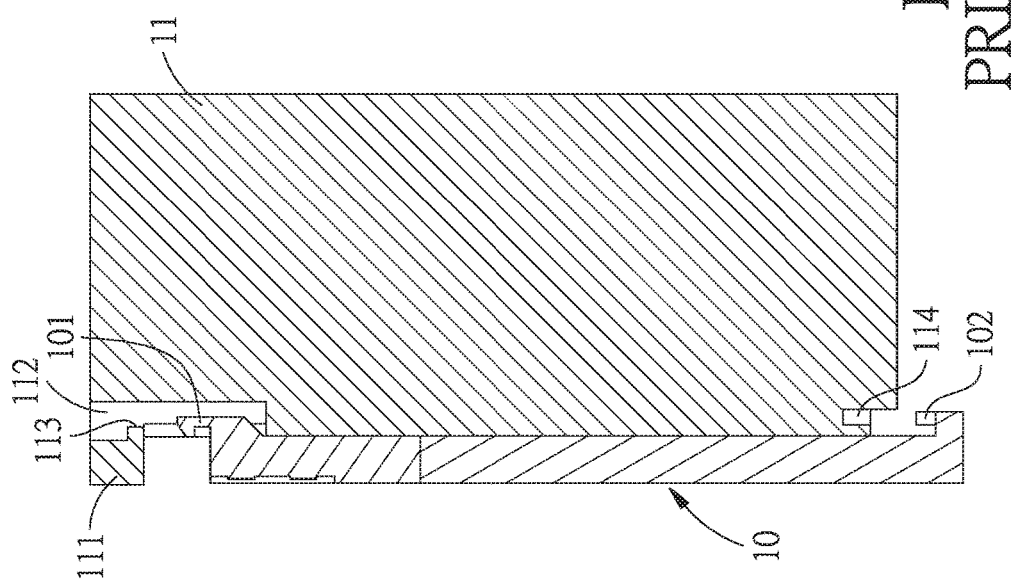
FIG. 2 is a cross sectional assembly of FIG. 1.
Figure 3:
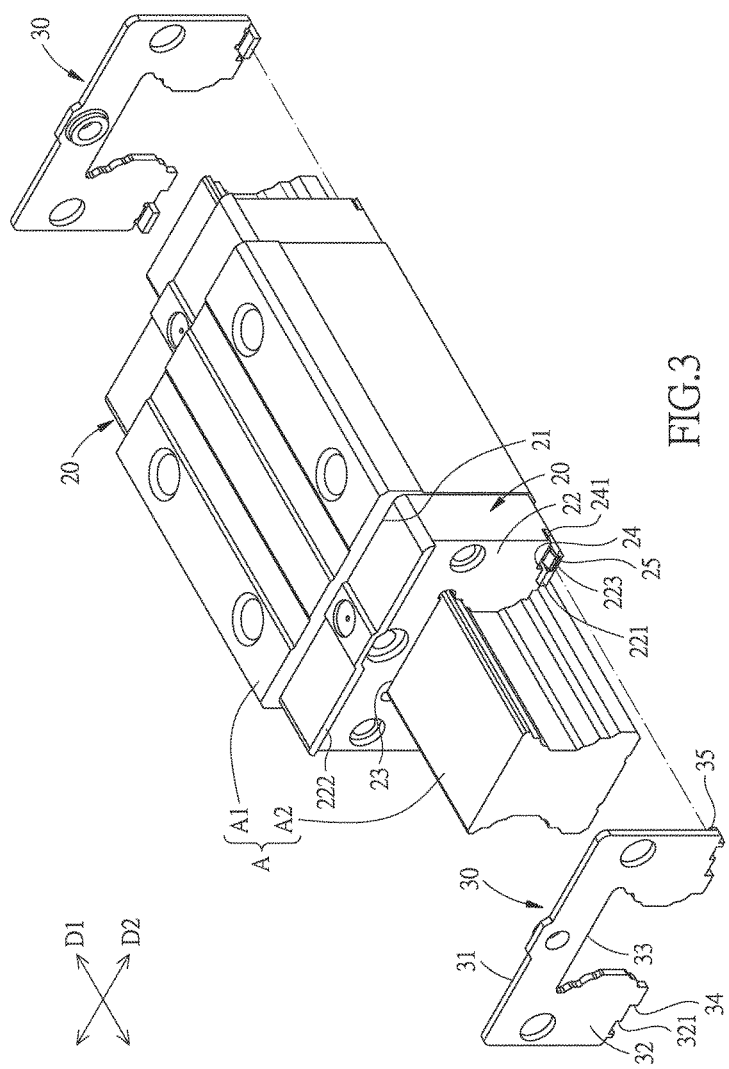
FIG. 3 is an exploded view of a linear guideway with quick-release scraping plates in accordance with a preferred embodiment of the present invention.
Figure 4:
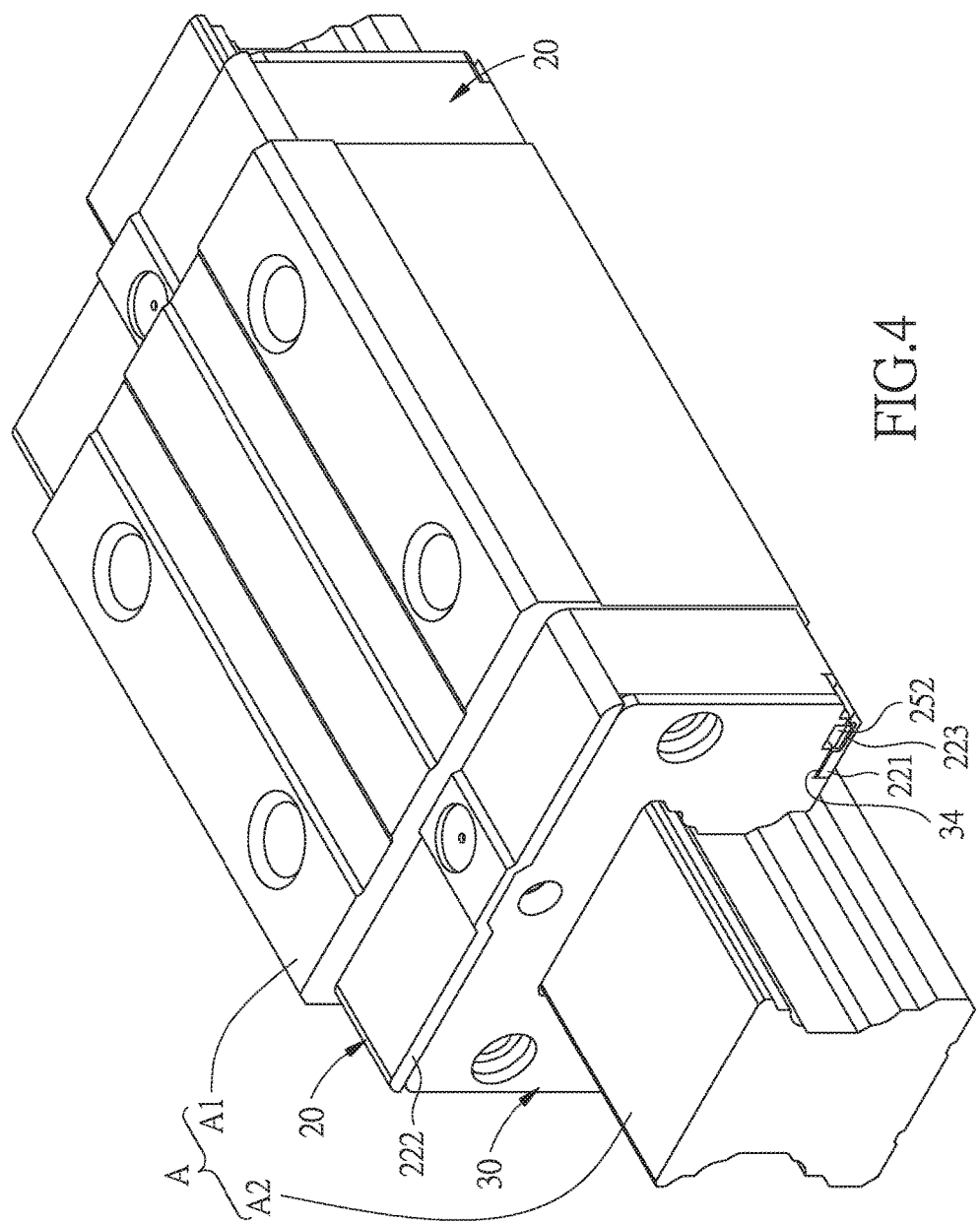
FIG. 4 is an assembly view of the linear guideway with quick-release scraping plates in accordance with the preferred embodiment.
Figure 5:
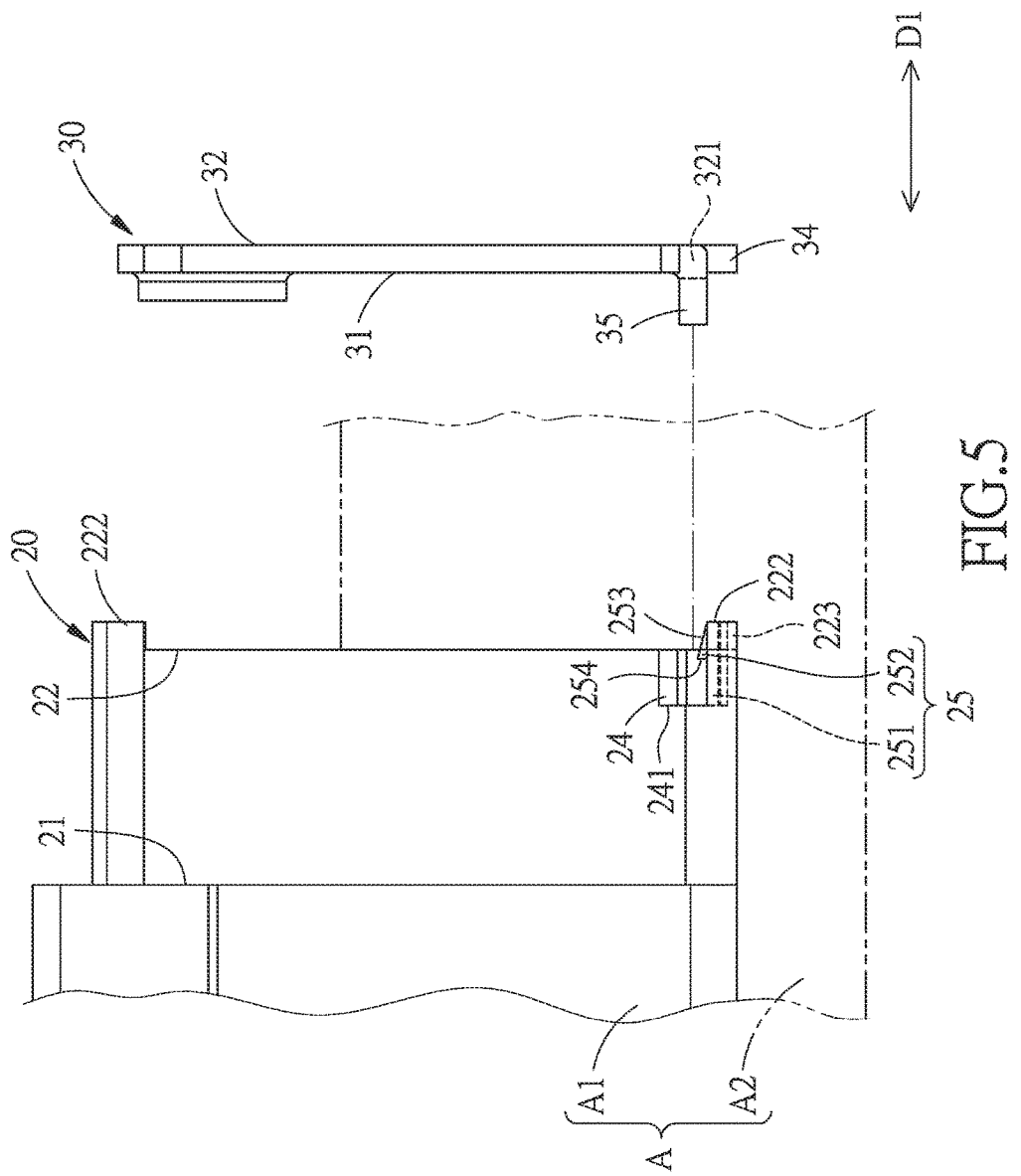
FIG. 5 is a side view of the linear guideway with quick-release scraping plates in accordance with the preferred embodiment.
Figure 6:
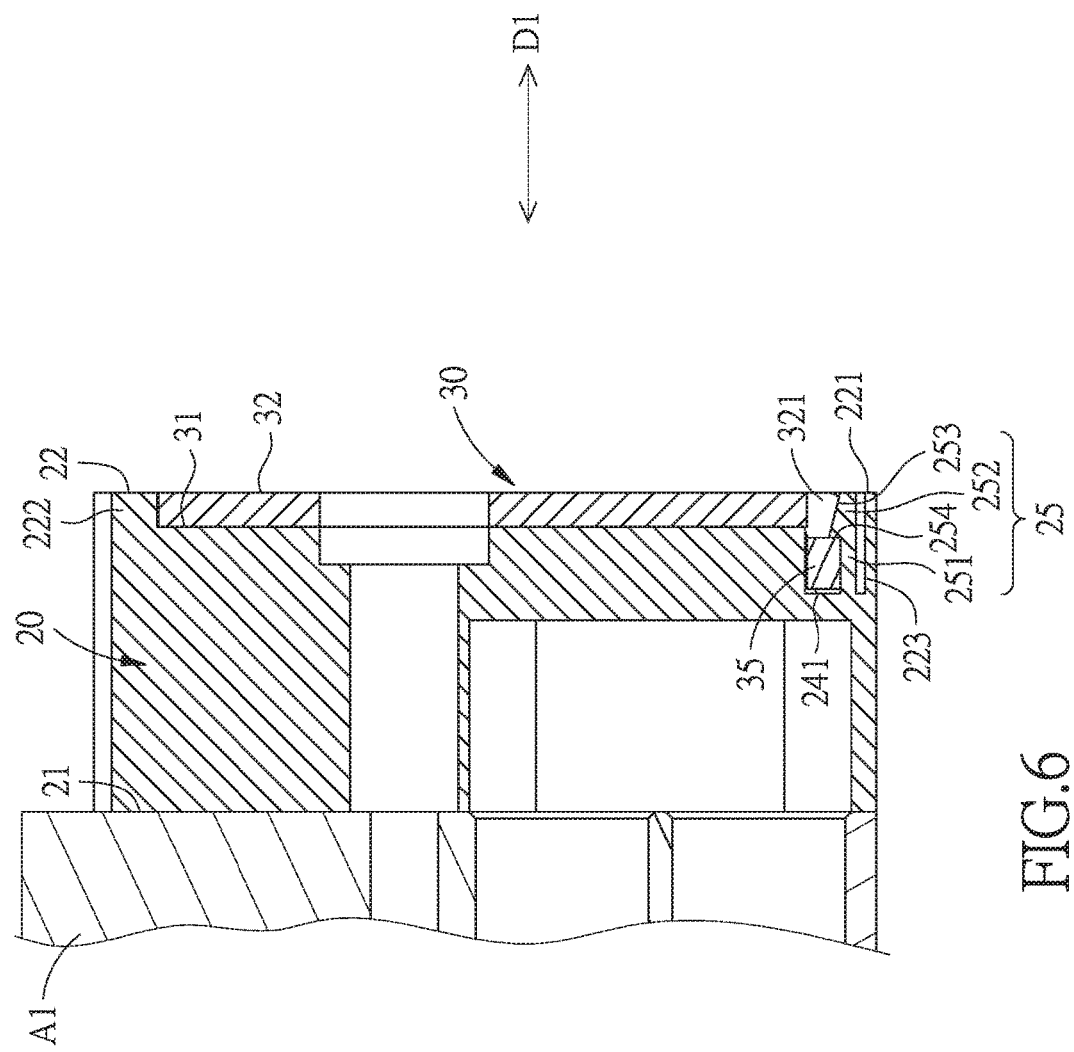
FIG. 6 is a cross sectional assembly view of the linear guideway with quick-release scraping plates in accordance with the preferred embodiment.
Figure 7C:
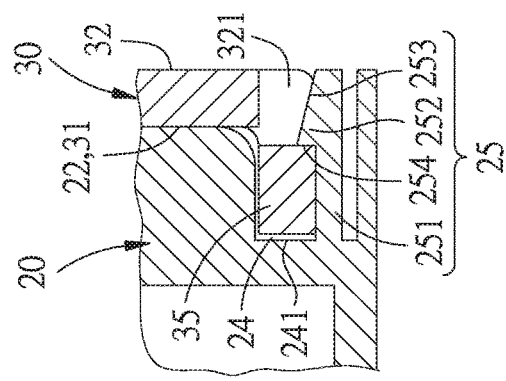
FIG. 7C is a third operational view showing assembling of the scraping plates to the end cap in accordance with the present invention.
Figure 7B:
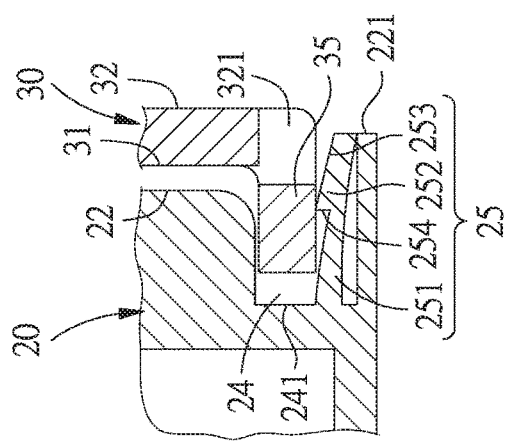
FIG. 7B is a second operational view showing assembling of the scraping plates to the end cap in accordance with the present invention.
Figure 7A:
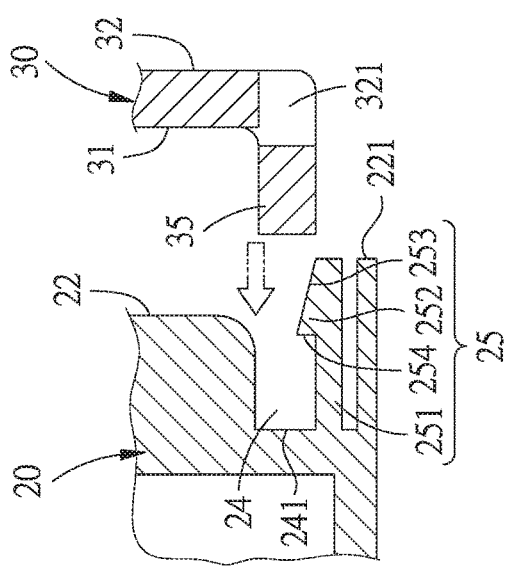
FIG. 7A is an operational view showing assembling of the scraping plates to the end cap in accordance with the present invention.

Referring to FIGS. 3-8C, a linear guideway with quick-release scraping plates in accordance with the preferred embodiment of the present invention comprises: a linear guideway A, two end caps 20, and two scraping plates 30.

The linear guideway A includes a slide block A1 slidably mounted on a rail A2.

The two end caps 20 are disposed at two ends of the slide block A1, respectively. The two end caps 20 are identical, therefore only one end cap will be described in detail. Each of the end caps 20 includes a first end surface 21 and an opposing second end surface 22. The first end surface 21 is abutted against the slide block A1. A direction perpendicular to the first and second end surfaces 21, 22 is defined as a first direction D1, and a direction perpendicular to the first direction D1 is defined as a second direction D2. The end cap 20 includes a U-shaped engaging gap 23. One side of the end cap 20 adjacent to the bottom of the U-shaped engaging gap 23 is defined as a top side of the end cap 20, consequently another opposing side is defined as the bottom side of the end cap 20. The second end surface 22 of the end cap 20 is provided with a bottom flange 221 which is located at the bottom side of the end cap 20 and extends in the first direction D1. The second end surface 22 is further provided with a top flange 222 which is located at the top side of the end cap 20 and extends in the first direction D1. Besides, on the second end surface 22 are further formed two connecting grooves 24 which are located at two sides of the engaging gap 23 and connected to the bottom flange 221. Each of the connecting grooves 24 is defined by a plurality of flat surfaces, and one of the flat surfaces is a bottom surface 241 which is in parallel to the second end surface 22. The bottom flange 221 is provided with a sunken portion 223 which communicates with the connecting grooves 24. The bottom surface 241 of each of the connecting grooves 24 is formed with a cantilever hook 25 which has one end connected to the bottom surface 241 and another end inserted in the sunken portion 223. Each of the cantilever hooks 25 includes an extension portion 251 and a hook portion 252. The extension portion 251 is in the form of a flat board. The hook portion 252 is a triangle structure which has an outer inclined surface 253 and an inner abutting surface 254 which is connected to the extension portion 251. One end of the outer inclined surface 253 adjacent to the bottom surface 241 is higher than the extension portion 251, another opposing end of the outer inclined surface 253 is exposed out of the connecting grooves 24 in the first direction D1, and the inner abutting surface 254 defines an angle of 90 degrees with respect to the extension portion 251. The two end caps 20 are mounted on the rail A2 in such a manner that the rail A2 is inserted in the engaging gap 23, and the first end surfaces 21 are abutted against two ends of the slide block A1.

The two scraping plates 30 are identical, and therefore only one scraping plate 30 will be described. The scraping plate 30 includes an inner surface 31, an opposing outer surface 32, and a mounting gap 33 which is formed in the shape of the engaging gap 23. One side of the scraping plate 30 adjacent to the bottom of the mounting gap 33 is defined as a top edge of the scraping plate 30, and another opposing side is defined as a bottom edge of the scraping plate 30. Two recesses 34 are formed at the bottom edge of the scraping plate 30 and located at two sides of the mounting gap 33. There is an abutting protrusion 35 at the connection between the inner surface 31 of the scraping plate 30 and each of the recesses 34. The abutting protrusions 35 are perpendicular to the inner surface 31 of the scraping plate 30. On the outer surface 32 are formed an operation recesses 321 which are located adjacent to the abutting protrusions 35, respectively. The two scraping plates 30 are mounted on the rail A2 in such a manner that the rail A2 is inserted in the mounting gaps 33, the inner surfaces 31 of the scraping plates 30 are abutted against the second end surfaces 22 of the end caps 20, the abutting protrusions 35 are inserted in the connecting grooves 24, and the hook portions 252 of the cantilever hooks 25 are hooked in the operation recesses 321.

What mentioned are structure relations of the components of the linear guideway with a quick-release scraping plate in accordance with the preferred embodiment of the present invention. For the assembling of the scraping plate 30 onto the end cap 20, please see FIGS. 7A-7C, the inner surface 31 of the scraping plate 30 is located toward the second end surface 22 of the end cap 20, and the abutting protrusion 35 is aligned with the connecting groove 24 of the end cap 20 (for easy explanation, only an abutting protrusion 35 and a connecting groove 24 will be described), then the scraping plate 30 moves toward the first direction D1 until the abutting protrusion 35 comes into contact with and is guided by the outer inclined surface 253 of the hook portion 252 of the cantilever hook 25 to press down the hook portion 252, so that the abutting protrusion 35 can climb over the hook portion 252 and will be restricted between the inner abutting surface 254 of the hook portion 252 and the bottom surface 241 of the end cap 20, and the operation recess 321 is aligned with the hook portion 252. At this moment, the hook portion 252 will recover its shape and will be resiliently hooked against the abutting protrusion 35. Besides, the bottom flange 221 of the end cap 20 will be engaged in the recess 34 of the scraping plate 30, and the top edge of the scraping plate 30 will be abutted against the top flange 222 of the end cap 20, so that the scraping plate 30 can be restricted firmly between the top and bottom flanges 222, 221 of the end cap 20.

The disassembly of the scraping plate 30 requires the use of a rod T which can be partially inserted in the operation recess 321, as shown in FIGS. 8A-8C. When one end of the rod T is inserted in the operation recess 321, and another end which is exposed out the operation recess 321 can be pushed upward to make the end inserted in the operation recess 321 press the hook portion 252 downward, so that the cantilever hook 25 can be disengaged from the abutting protrusion 35 to release the scraping plate 30 from the end cap 20.

As mentioned above, the assembly of the scraping plate 30 in accordance with the present invention is very easy since it only requires the displacement of the scraping plate 30 in one direction (namely the first direction D1), and the disassembly of the scraping plate 30 is also very convenient since it only requires the use of a rod T.

While we have shown and described various embodiments in accordance with the present invention, it is clear to those skilled in the art that further embodiments may be made without departing from the scope of the present invention.

What is claimed is:

1. A linear guideway with quick-release scraping plates, comprising:
 a linear guideway including a slide block slidably mounted on a rail;
 two end caps each including a first end surface, an opposing second end surface, and an engaging gap, the second end surface being provided with two connecting grooves which are located at two sides of the engaging gap, each of the connecting grooves being defined by a plurality of flat surfaces, wherein one of the flat surfaces is a bottom surface which is in parallel to the second end surface, the bottom surface of each of the connecting grooves is formed with a cantilever hook which has one end connected to the bottom surface and another end provided with a hook portion, the two end caps are mounted on the rail in such a manner that the rail is inserted in the engaging gaps, and the first end surfaces of the end caps are abutted against two ends of the slide block; and
 two said scraping plates each including an inner surface, an opposing outer surface, a mounting gap, and two recesses located at two sides of the mounting gap, an abutting protrusion being formed at a connection between the inner surface of the scraping plates and each of the recesses, wherein the abutting protrusions are perpendicular to the inner surface, on the outer surface are formed two operation recesses which are located adjacent to the abutting protrusion, respec-tively, the two scraping plates are mounted on the rail in such a manner that the rail is inserted in the mounting gaps, the inner surfaces of the scraping plates are abutted against the second end surfaces of the end caps, the abutting protrusions are inserted in the connecting grooves, and the hook portions of the cantilever hooks are hooked in the operation recesses.

2. The linear guideway as claimed in claim 1, wherein the engaging gap are U-shaped, one side of each of the end caps adjacent to a bottom of the U-shaped engaging gap is defined as a top side of the end caps, and another opposing side is defined as a bottom side of the end caps, each of the mounting gaps is formed in the shape of the engaging gap, one side of each of the scraping plates adjacent to a bottom of the mounting gap is defined as a top edge of each of the scraping plates, another opposing side of each of the scraping plates is defined as a bottom edge.

3. The linear guideway as claimed in claim 2, wherein the second end surface of each of the end caps is provided with a bottom flange which is located at the bottom side of the end caps and extends in a first direction, the second end surface is provided with a top flange which is located at the top side of the end caps and extends in the first direction, and each of the scraping plates is restricted between the top flange and the bottom flange of the end caps.

4. The linear guideway as claimed in claim 3, wherein the connecting grooves of each of the two end caps are connected to the bottom flanges, the recesses are formed at the bottom edge of the respective scraping plates, each of the bottom flanges is provided with a sunken portion which communicates with the connecting grooves, and each of the cantilever hooks has the another end inserted in a corresponding one of the sunken portions.

5. The linear guideway as claimed in claim 1, wherein each of the cantilever hooks includes an extension portion and a hook portion, the extension portion is in the form of a flat board, the hook portion is a triangle structure which has an outer inclined surface and an inner abutting surface which is connected to the extension portion, one end of the outer inclined surface adjacent to the bottom surface is higher than the extension portion, another opposing end of the outer inclined surface is exposed out of the connecting grooves in the first direction, and the inner abutting surface defines an angle of 90 degrees with respect to the extension portion.

6. A linear guideway with quick-release scraping plates, comprising:
 a linear guideway including a slide block slidably mounted on a rail;
 two end caps each including a first end surface, an opposing second end surface, and a cantilever hook which has one end connected to the second end surface and another end provided with a hook portion, the two end caps are mounted on the rail in such a manner that the first end surfaces of the end caps are abutted against two ends of the slide block; and
 two said scraping plates each including an inner surface, an opposing outer surface, and two recesses, an abutting protrusion being formed at a connection between the inner surface of the scraping plates and each of the recesses, wherein the abutting protrusions are perpendicular to the inner surface, on the outer surface are formed two operation recesses which are located adjacent to the abutting protrusions, respectively, the two scraping plates are mounted on the rail in such a manner that the inner surfaces of the scraping plates are abutted against the second end surfaces of the end caps, the scraping plates move in a first direction until the abutting protrusions climb over and are hooked by the cantilever hooks, and the scraping plates are released by inserting a rod into the operation recesses and pressing the cantilever hooks.

7. The linear guideway as claimed in claim 6, wherein the second end surface is provided with two connecting grooves, each of the connecting grooves is defined by a plurality of flat surfaces, one of the flat surfaces is a bottom surface which is in parallel to the second end surface, the cantilever hooks each have one end connected to the bottom surface, and each of the scraping plates moves in a first direction until the abutting protrusions are inserted in the connecting grooves and hooked by the cantilever hooks.

8. The linear guideway as claimed in claim 7, wherein each of the cantilever hooks includes an extension portion and a hook portion, the extension portion is in the form of a flat board, the hook portion is a triangle structure which has an outer inclined surface and an inner abutting surface which is connected to the extension portion, one end of the outer inclined surface adjacent to the bottom surface is higher than the extension portion, another opposing end of the outer inclined surface is exposed out of the connecting grooves in the first direction, and the inner abutting surface defines an angle of 90 degrees with respect to the extension portion.

9. The linear guideway as claimed in claim 7, wherein each of the end caps includes an engaging gap for insertion of he rail, the two connecting grooves are located at two sides of the engaging gap, the engaging gap is U-shaped, one side of each of the end caps adjacent to a bottom of the U-shaped engaging gap is defined as a top side of the end caps, another opposing side is defined as a bottom side of the end caps, the scraping plates each include a mounting gap which is formed in the shape of the engaging gap, one side of each of the scraping plates adjacent to the bottom of the mounting gap is defined as a top edge of each of the scraping plates, another opposing side of each of the scraping plates is defined as a bottom edge, the second end surface of each of the end caps is provided with a bottom flange which is located at the bottom side of the end caps and extends in a first direction, the second end surface is provided with a top flange which is located at the top side of the end caps and extends in the first direction, and each of the scraping plates is restricted between the top flange and the bottom flange of the end caps.

10. The linear guideway as claimed in claim 9, wherein the connecting grooves of each of the two end caps are connected to the bottom flanges, the recesses are formed at the bottom edge of the respective scraping plates, each of the bottom flanges is provided with a sunken portion which communicates with the connecting grooves, and each of the cantilever hooks has the another end inserted in a corresponding one of the sunken portions.

* * * * *